United States Patent
Arnason

(10) Patent No.: US 10,575,534 B2
(45) Date of Patent: Mar. 3, 2020

(54) TRACING WITH VISION

(71) Applicant: SKAGINN HF, Akranes (IS)

(72) Inventor: Ingolfur Arnason, Akranes (IS)

(73) Assignee: SKAGINN HF, Akranes (IS)

( * ) Notice: Subject to any disclaimer, the term of this patent is extended or adjusted under 35 U.S.C. 154(b) by 0 days.

(21) Appl. No.: 15/309,119

(22) PCT Filed: May 5, 2015

(86) PCT No.: PCT/IS2015/050006
§ 371 (c)(1),
(2) Date: Nov. 4, 2016

(87) PCT Pub. No.: WO2015/170350
PCT Pub. Date: Nov. 12, 2015

(65) Prior Publication Data
US 2017/0071221 A1    Mar. 16, 2017

(30) Foreign Application Priority Data
May 5, 2014    (IS) .............................. 9046

(51) Int. Cl.
*A22C 25/08* (2006.01)
*G06Q 10/08* (2012.01)
(Continued)

(52) U.S. Cl.
CPC .............. *A22C 25/08* (2013.01); *A22C 17/10* (2013.01); *A22C 25/04* (2013.01); *B07C 5/3422* (2013.01); *B63B 35/14* (2013.01); *G06Q 10/0833* (2013.01)

(58) Field of Classification Search
CPC .... B07C 5/00; B07C 5/16; B07C 5/18; B07C 5/34; B07C 5/342; B07C 5/3422;
(Continued)

(56) References Cited

U.S. PATENT DOCUMENTS

| | | | |
|---|---|---|---|
| 2,775,785 A | 1/1957 | Kurzbin | |
| 5,314,072 A * | 5/1994 | Frankel | ................ B07C 5/3408 |
| | | | 209/44.1 |

(Continued)

FOREIGN PATENT DOCUMENTS

| | | |
|---|---|---|
| CH | 701341 A2 | 12/2010 |
| WO | 2005052704 A2 | 6/2005 |
| WO | 2012008843 A1 | 1/2012 |

OTHER PUBLICATIONS

Iceland Search Report from corresponding Iceland Application No. 9046, dated Aug. 14, 2014.
(Continued)

*Primary Examiner* — Charles A Fox
*Assistant Examiner* — Kalyanavenkateshware Kumar
(74) *Attorney, Agent, or Firm* — Muncy, Geissler, Olds & Lowe, P.C.

(57) ABSTRACT

The present invention relates to an apparatus, a method and a fishing vessel for tracing items such as fish. The object is specifically to trace smaller items like pelagic fish, such as mackerel and herring or salmon. The tracing apparatus and method uses at least one image means to provide tracing of each item in a batch, where image data is linked to an ID number of the batch.

17 Claims, 2 Drawing Sheets

(51) Int. Cl.
*A22C 17/10* (2006.01)
*A22C 25/04* (2006.01)
*B07C 5/342* (2006.01)
*B63B 35/14* (2006.01)

(58) Field of Classification Search
CPC ......... A22C 17/10; A22C 25/04; A22C 25/08; B63B 35/14
USPC ........ 209/3.1, 552, 512, 589, 592, 645, 646, 209/698, 932
See application file for complete search history.

(56) References Cited

U.S. PATENT DOCUMENTS

| | | |
|---|---|---|
| 7,949,154 B2 | 5/2011 | Deluca |
| 2010/0051513 A1 | 3/2010 | Skyum et al. |
| 2010/0282833 A1 | 11/2010 | Thorsson et al. |
| 2012/0009858 A1 | 1/2012 | Larsen |

OTHER PUBLICATIONS

International Search Report from corresponding PCT Application No. PCT/IS2015/050006, dated Jul. 20, 2015.

\* cited by examiner

TRACING WITH VISION

FIELD OF THE INVENTION

The present invention relates to an apparatus, fishing vessel, and a method of tracing food items in large quantities, such as fish, using vision technology. Moreover, the present invention relates a method of tracing items through sorting and packing and using that information to market and solve disputes of damaged goods.

BACKGROUND OF THE INVENTION

Items or objects such as many food objects are marketed and sold in batches of predetermined size, weight or number of objects in each package. In the recent years, the food industry has been looking for a good method to trace their product through the production line, from slaughtering/catching to the end user/buerThere is therefore a need for a method. It would be very beneficial to have a tracing method for associating information that is unique to the item to the item or a batch of items through batching and packing. Information such as source, date of catching, slaughtering or manufacturing as well as information relating to the processing can easily be stored and associated with items using modern database and unique ID technology.

There are many uses for such information, where source or history of processing is stored for later use. In the food industry, such as the meat processing industry, methods have been developed to trace meat products through packaging of primal cuts back to a carcass from which the primal cuts was obtained. Then these primal can be traced forward if they are re-packed or used in preparing half-cooked or cooked food for sale in supermarkets. If the tracing method is used such that the information on the origin of the food items is associated with the food through the whole process, it is possible to identify from which animal the meet came if a problem arises. Information food items which are either individually packed or packed in batches may be recalled in order to trace to its origin.

U.S. Pat. No. 7,949,154 discloses a method for associating source information with food products, where a computer method and imaging sensors which capture image data of an object, as it moves through a processing facility and is converted into individual food products. The image data is then analysed and the computer method produces a blob for the objects and source information referenced with the object can be associated with the object's blob. The blob is then used to trace and identify the object, and to determine when one or more additional objects have been converted from the object being monitored.

It would be very beneficial to have a tracing method which can be used to identify the source of problems or contamination when the food items have been packed, distributed and sold in the marketplace.

SUMMARY OF THE INVENTION

It is an object of the present invention to overcome or ameliorate the aforementioned drawbacks of the prior art and to provide an improved and/or alternative and/or additional method, apparatus or fishing vessel for tracing items such as fish. It is one preferred object of the present invention to provide a device with at least one image means for image analysis of each item and storing the data obtained by the image means in a database to provide tracing. Moreover, it is a preferred object of the present invention to provide an efficient design, preferably with to transport each item separately and to perform an image analysis of each item at high speed and determine the destination based on the image data. Another preferred object of the present invention is to provide a device having conveyor belt with separated spaces to transport each item separately and where the conveyor has an inclining and a declining portion. Between separations or cleats in the conveyor belt, pockets are formed to fit one item in each pocket. It is the combination of a) the speed of the belt, b) transporting each item separately and c) using at least one image means to obtain more than one view of the item, which provides the improved method and device resulting in more comprehensive image data for each item. As the characteristic data for each item is stored in a database and the packing destiny of each item is known and stored with an ID, the items can be traced after packing and until after they are sold.

The object(s) underlying the present invention is (are) particularly solved by the features defined in the independent claims. The dependent claims relate to preferred embodiments of the present invention. Further additional and/or alternative aspects are discussed below.

The present invention relates to an apparatus, a fishing vessel and method for tracing items such as fish. Although tracing in food industry is known, methods for tracing each items during processing and packing items such as fish in large quantity are not known. The object is specifically to trace smaller items like pelagic fish, such as mackerel and herring or salmon which are caught in large quantity and packed for shipment and sale. Thus, at least one of the preferred objects of the present invention is solved by an apparatus for tracing items where a cleated conveyor receives items from an in-feed station, but the in-feed station is loaded by items coming off an in-feed conveyor. Then at least one image means is used to provide tracing of items which are being batched in large quantity. A first camera is positioned above the cleated conveyor belt to capture images of the items as it is transported thereby on its way to a batching and/or packing. In certain embodiments, the conveyor is a cleated conveyor with an inclining and a declining portion, where the cleats form pockets to fit one item in each pocket. The high point of the cleated conveyor belt, i.e. after the inclining portion and before the declining portion is narrow and defined by only the distance between two adjacent cleats of the conveyor belt. The camera is then positioned directly above the high point of the cleated conveyor belt and captures images of the item as it is transported thereby. As the fish rolls over the high point during the movement of the cleated conveyor belt from the inclining movement to the declining movement the fish rolls from side to side and therefore, the camera is able to capture more than one side/view of the fish. By having image data of all the items in the pockets the computer determine which batch each fish is sent to, store image data of each fish in each batch and assign a special ID to each batch as it is packed. This gives a number of possibilities with respect to marketing and problem solving. For example if the buyer complains about the product, the seller can go into the database and produce image data of all the items in a certain batch which was packed together. It is also possible to offer a batch of items for sale, where the buyer can view the items in the batch.

The aim of the present invention relates to provide an apparatus, method and method for tracing items such as fish. The selection of items is based on the characteristics determined by the camera. The benefits of the apparatus, method and the method of the present invention are that the first camera allows determination of several characteristics of each item and stores the data in a database. The computer matches the characteristics data in the data base with each paced unit, so therefore all the items in each package of items are known. Each package gets it's own ID for later use when tracing is needed.

In the first aspect of the present invention an apparatus is provided for tracing items. The apparatus comprises a conveyor, where the conveyor has a cleated conveyor belt for transporting single items between each two cleats and at least one image means, which determines at least one characteristic property of the items being transported on the cleated conveyor belt. The apparatus further comprises at least one diverting means, at least one collection bin, said at least one collection bin being a part of a packing station, and computing means. The apparatus is characterised in that two or more views of the items are obtained by the at least one image means and based on data from the first image means, selected items are diverted to a collection bin by a diverting means and the computing means and packed in a unit which is given an ID. Furthermore, the at least one characteristic property of each item and the ID of the unit, which the item is packed in, is stored in a database.

In a second aspect of the present invention a method is provided for tracing items. The method comprises transporting the items on a conveyor belt, where the conveyor has a cleated conveyor belt for transporting single items between each two cleats and determining at least one characteristic property of the items being transported on cleated conveyor belt by at least one image means. The method further comprises the step of diverting selected items to a collection bin by a diverting means, said collection bin being a part of a packing station. The method is characterised in that two or more views of the items are obtained by the at least one image means and based on data from the first image means, selected items are diverted to a collection bin by a diverting means and the computing means and packed in a unit which is given an ID. Furthermore, the at least one characteristic property of each item and the ID of the unit, which the item is packed in, is stored in a database.

In a third aspect of the present invention an apparatus is provided for tracing items. The apparatus comprises an in-feed means, an in-feed station, a cleated conveyor belt, where a portion of the cleated conveyor belt is raised relative to an in-feed and an out feed end of the cleated conveyor belt, a first image means, which determines at least one characteristic property of the items as they pass the point of the cleated conveyor belt which is raised, diverting means and a collection bin, said collection bin being a part of a packing station. The apparatus is characterised in that based on data from the first image means, selected items are diverted to a collection bin by a diverting means and the computing means and packed in a unit which is given an ID, and in that the at least one characteristic property and of each item and the ID of the unit, which the item is packed in, is stored in a database.

In a forth aspect of the present invention a fishing vessel is provided for catching and slaughtering fish, said fishing vessel comprising an apparatus for tracing items. The apparatus comprises a conveyor, where the conveyor has a cleated conveyor belt for transporting single items between each two cleats and at least one image means, which determines at least one characteristic property of the items being transported on the cleated conveyor belt. The apparatus further comprises at least one diverting means, at least one collection bin, said at least one collection bin being a part of a packing station, and computing means. The apparatus is characterised in that two or more views of the items are obtained by the at least one image means and based on data from the first image means, selected items are diverted to a collection bin by a diverting means and the computing means and packed in a unit which is given an ID. Furthermore, the at least one characteristic property of each item and the ID of the unit, which the item is packed in, is stored in a database.

DESCRIPTION OF THE INVENTION

Figure 1:
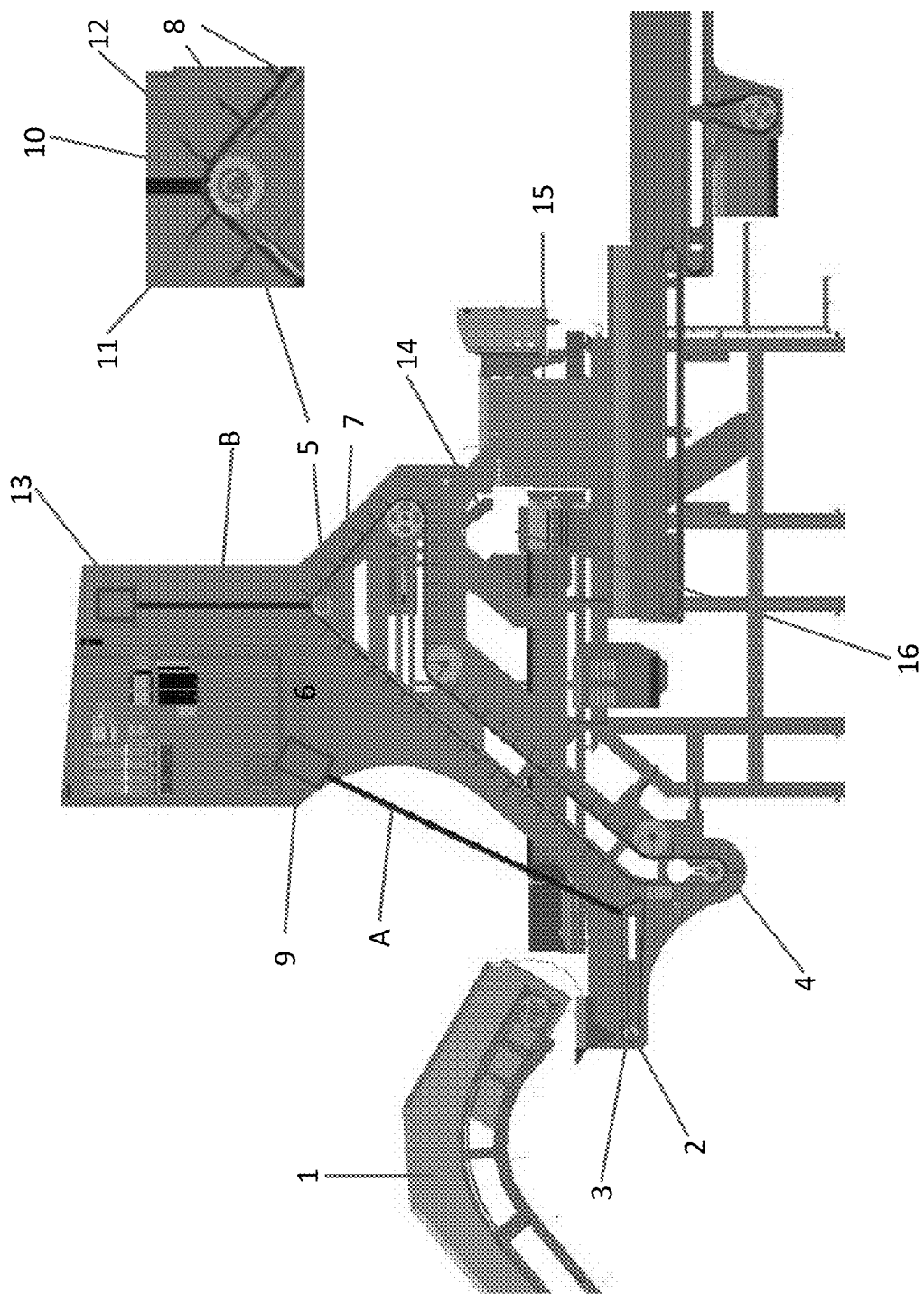
FIG. 1 shows the different components of the apparatus of the present invention in an embodiment where an in-feed conveyor is used to feed the apparatus and where the apparatus is a cleated conveyor belt.

The following embodiments relate to the method, the fishing vessel and the apparatus of the invention.

In an embodiment of the present invention a scale is positioned before or after the conveyor belt. The scale can be a flow scale/dynamic scale is positioned under the belt of the conveyor.

In an embodiment of the present invention an electronic nose is positioned by the conveyor where the items pass by.

In an embodiment of the present invention the apparatus further comprises an in-feed means and an in-feed station, where the conveyor belt is a cleated conveyor belt and where a portion of the cleated conveyor belt is raised relative to an in-feed and an out feed end of the cleated conveyor belt. In this embodiment the distance between two adjacent cleats of the conveyor belt allows conveying one item only in a space between two adjacent cleats.

In an embodiment of the present invention the in-feed means is an in-feed conveyor.

In an embodiment of the present invention an axis raises the cleated conveyor belt between the in-feed and the out-feed end forming a top position and wherein an in-feed portion of the belt is at least partially inclining and an out feed-portion is at least partially declining. In this embodiment the first image means is positioned above the top position of the cleated conveyor belt.

In an embodiment of the present invention a second image means directed to the in-feed station to detect the volume of items in the in-feed station.

In an embodiment of the present invention, where the apparatus is on-board a fishing vessel, the computing means sends information on the characteristics of the fish to a controller. In the present context the controller is one or more of a controller of the ship, a decision maker on shore, buyer at a fish market, controller at a fish factory or surveillance officer at an authority on shore. There is a great advantage in being able to send real-time image data and other data on the characteristics of the fish being caught.

In an embodiment of the present invention the characteristic data is stored directly after being obtained in a database or a cloud, where controllers can access the date in real-time or at a later time point.

In an embodiment of the present invention the characteristic data is sent directly to the controller of the ship will give the controller information on size and weight distribution as well as condition of the fish and allow the controller to adjust time and speed of towing. The data may also be sent directly to the owner of the ship to give real-time information on the catching.

In an embodiment of the present invention the characteristic data is sent directly to a controller at shore, where the controller is a factory manager and can make preparations based on the fish being caught. The characteristic data can also be sent directly to a fish market, where the buyer can view images before purchasing. The characteristic data can also be sent to a research facility to determine the size and shape of a straddling stock or any species, such as herring, mackerel or salmon. The characteristic data can also be sent to a surveillance authority to monitor and regulate the fishing of a certain species or how much of a quota for a species has been obtained.

In an embodiment of the present invention the computing means regulates the speed of the in-feeding means and the image means for determining at least one characteristic property of each single items during rolling of the items from side to side as they pass from the inclining to the declining portion of the belt.

In an embodiment of the present invention the two or more views of the items are obtained by the at least one image means or two or more image means positioned at different positions before and/or above the cleated conveyor belt.

In an embodiment of the present invention the at least first image means is positioned above the portion of the conveyor belt which is raised by an axle between an in-feed and an out feed end of the cleated conveyor belt.

In an embodiment of the present invention the items to be traced are pelagic fish, such as herring or mackerel.

DETAILED DESCRIPTION OF THE INVENTION

The invention will now be described in relation to the drawings with reference numerals to indicate the different components of the invention.

FIG. 1 shows the different components of the apparatus of the present invention in an embodiment where an in-feed conveyor is used to feed the apparatus and where the apparatus is a cleated conveyor belt. The drawing is a side view of the device where the outer side has been removed. In this embodiment the apparatus is designed to batch pelagic fish, such as herring or mackerel and provide tracing options by storing data of each fish in a database. An endless in-feeding conveyor belt 1 transports the items to an in-feeding station 2. The end of the in-feed belt shown in FIG. 1 has an inclining portion and a short declining portion in order to allow the items to drop into the in-feed station. The in-feed station is a receptacle with a conveyor belt 3 at the bottom to transfer the items towards the in-feeding end of the cleated conveyor 4. The portion of the cleated conveyor which transports items runs over a roller or axis 5, which raises the transporting portion defining an inclining in-feed portion 6 and a declining out-feed portion 7. The cleats 8 of the cleated conveyor belt 4 are at an interval which creates pocket size holding one herring or mackerel (see enlarged portion of the top part of the cleated conveyor). A first camera 9 is positioned above the in-feed station in obtains images of the in-feed station (see beam A). Data from the first camera is used to determine the current/real time volume/amount of fish in the in-feed station. The computer regulates the speed of the in-feed conveyor 1 based on the volume in the in-feed station, such that if the volume is decreasing the speed of the in-feed conveyor is increased, but if the volume is increasing then the speed of the in-feed conveyor is decreased. This feature is important in order to fill each pocket on the cleated conveyor belt, which is important to provide a faster tracing method.

When each pocket 10 is transported over the roller 5, the position of the fish in the pocket may shift as it is carried up by the aft cleat 11 forming the pocket until it is directly above the roller when the aft cleat pushes the fish onto the front cleat 12 which carries the fish the remaining distance. A second camera 13 is positioned above the belt where it passes the roller 5 obtaining images of the fish during the transport over the roller and determining at least one characteristic property of the fish. Because of the shift of the fish in the pocket 10, the camera is able to obtain images of more than one side of the fish. The items fall off the out-feed end of the cleated conveyor belt and a diverting means 14 directs the item either into the collection bin 15 or onto a take-away conveyor 16, for sending the items back to the in-feed conveyor or the in-feed station. The computer collects image data from the second camera and determines which items are selected for the collection bin and which items are re-routed to the in-feed stream or rejected. Items of wrong species or damaged items are rejected or re-routed to another line, while desired items are collected in the collection bin.

Figure 2:
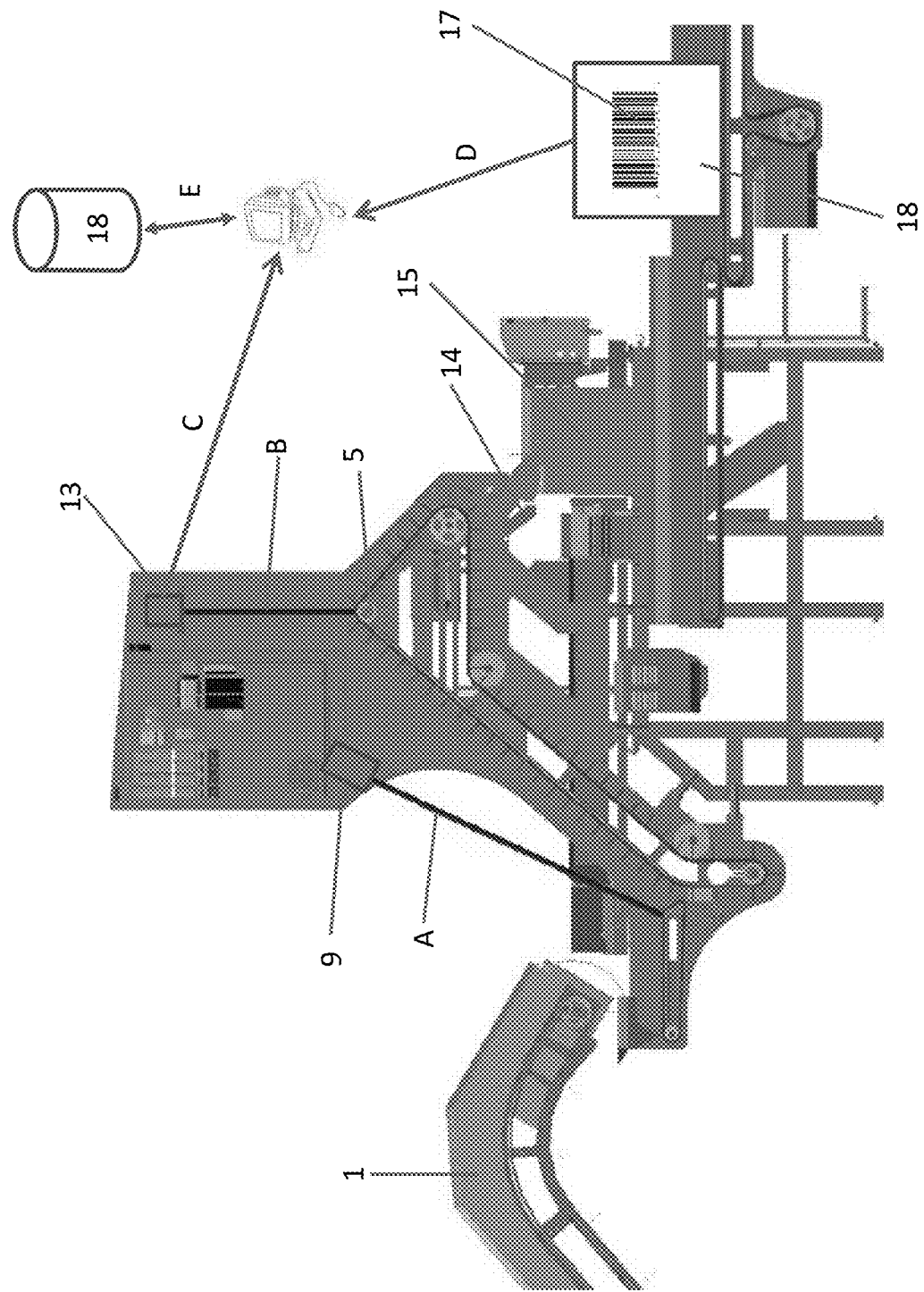
FIG. 2 shows the same type of apparatus of FIG. 1 where a computer obtains image data a camera.

FIG. 2 shows the same type of apparatus for the same embodiment where the computer obtains (C) the image data from camera 13. The computer also collects (D) an ID number 17 for each batch which leaves in a package 18 from the packing station 15. The computer then associates image data for all the items in the batch with the ID number of the batch for traceability and stores E the data as retrievable data in a database 19.

The present invention covers further embodiments with any combination of features from different embodiments described above. Reference signs in the claims are provided merely as a clarifying example and shall not be construed as limiting the scope of the claims in any way. The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantial constant" shall also cover exactly constant). The terms "a", "an", "first", "second" etc do not preclude a plurality.

The invention claimed is:

1. An apparatus for tracing items, the apparatus comprising:
   a conveyor, where the conveyor has a continuous cleated conveyor belt for transporting single items between each two cleats, said conveyor further comprising an axis raising the cleated conveyor belt between an in-feed end and an out-feed end forming a highest point of the continuous cleated conveyor belt and wherein the in-feed portion of the belt inclines to the highest point of the continuous cleated conveyor belt and an out feed-portion declines from the highest point of the continuous conveyor belt,
   at least one image means, which determines at least one characteristic property of the items being transported on the cleated conveyor belt, said at least one image means being positioned above the top position of the cleated conveyor belt,
   at least one diverting means,
   at least one collection bin, said at least one collection bin being a part of a packing station, and
   computing means;

wherein transporting the items over the top position of the cleated conveyor belt rolls the items from side to side providing more than one image view of the items and based on data from the at least one image means and the computing means, selected items are diverted to a collection bin by the diverting means and the computing means and packed in a unit which is given an ID, and in that the at least one characteristic property of each item and the ID of the unit, which the item is packed in, is stored in a database.

2. The apparatus according to claim 1, wherein a scale is positioned before or after the conveyor belt.

3. The apparatus according to claim 1, wherein a flow scale/dynamic scale is positioned under the belt of the conveyor.

4. The apparatus according to claim 1, wherein an electronic nose is positioned by the conveyor where the items pass by.

5. The apparatus according to claim 1, wherein the apparatus further comprises:
   an in-feed means, and
   an in-feed station.

6. The apparatus according to claim 5, wherein the in-feed means is an in-feed conveyor.

7. The apparatus according to claim 1, wherein the distance between two adjacent cleats of the conveyor belt allows conveying one item only in a space between two adjacent cleats.

8. The apparatus according to claim 1, further comprising a second image means directed to the in-feed station to detect the volume of items in the in-feed station.

9. The apparatus according to claim 1, wherein the conveyor is configured to alter a position of the items while being transported such that the apparatus obtains more than one view of the items.

10. The apparatus according to claim 1, wherein the conveyor is configured to change a position of the items on the conveyor and the at least one image means is configured to obtain images of the items before, during and after the position of the items is changed.

11. A method for tracing items, the method comprising:
   transporting the items on a conveyor, where the conveyor has a continuous cleated conveyor belt for transporting single items between each two cleats, wherein an in-feed portion of the continuous cleated conveyor belt inclines to a highest point of the continuous cleated conveyor belt and an out feed-portion declines from the highest point of the continuous conveyor belt,
   determining at least one characteristic property of the items being transported on the continuous cleated conveyor belt by at least one image means,
   diverting selected items to a collection bin by a diverting means, said collection bin being a part of a packing station;
   wherein two or more views of the items are obtained by the at least one image means and based on data from the at least one image means and a computing means, selected items are diverted to the collection bin by the diverting means and a computing means and packed in a unit which is given a ID, and in that the at least one characteristic property of each item and the ID of the unit the item is packed in is stored in a database.

12. The method according to claim 11, wherein a portion of the conveyor belt is raised by an axle between an in-feed and an out feed end of the cleated conveyor belt.

13. The method according to claim 11, wherein the apparatus further comprises:
   an in-feed means, and
   an in-feed station.

14. The method according to claim 11, wherein the items to be traced are fish.

15. The method according to claim 11, wherein the computing means stores information on the characteristics of the fish directly after the information has been obtained in a database or a cloud, where controllers can access the data in real-time or at a later time point.

16. The method according to claim 11, wherein the two or more views of the items are obtained by the at least one image means or two or more image means positioned at different positions before and above the cleated conveyor belt.

17. A fishing vessel for catching and slaughtering fish, said fishing vessel comprising an apparatus for tracing items, the apparatus comprising:
   a conveyor, where the conveyor has a continuous cleated conveyor belt for transporting single items between each two cleats, wherein an in-feed portion of the continuous cleated conveyor belt inclines to a highest point of the continuous cleated conveyor belt and an out feed-portion declines from the highest point of the continuous conveyor belt,
   at least one image means, which determines at least one characteristic property of the items being transported on the cleated conveyor belt,
   at least one diverting means,
   at least one collection bin, said at least one collection bin being a part of a packing station, and
   computing means;
   wherein two or more views of the items are obtained by the at least one image means and based on data from the at least one image means and the computing means, selected items are diverted to a collection bin by the diverting means and the computing means and packed in a unit which is given an ID, and in that the at least one characteristic property of each item and the ID of the unit, which the item is packed in, is stored in a database.

* * * * *